(No Model.)
L. L. PETETT.
PNEUMATIC SEAT CUSHION.
No. 588,288. Patented Aug. 17, 1897.
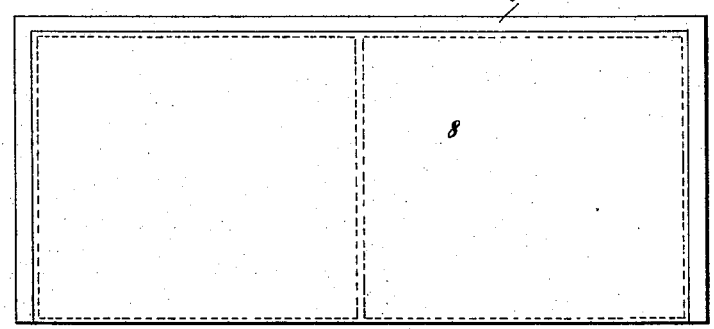
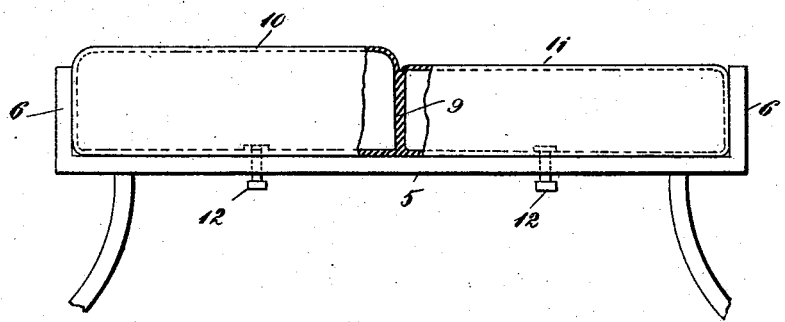
WITNESSES
John Buckler,
C. Gerst.
INVENTOR
Lewis L. Petett,
BY
Edgar Tate & Co.
ATTORNEYS.

UNITED STATES PATENT OFFICE.

LEWIS LYMAN PETETT, OF CATSKILL, NEW YORK.

PNEUMATIC SEAT-CUSHION.

SPECIFICATION forming part of Letters Patent No. 588,288, dated August 17, 1897.

Application filed February 17, 1897. Serial No. 623,845. (No model.)

*To all whom it may concern:*

Be it known that I, LEWIS LYMAN PETETT, a citizen of the United States, residing at Catskill, in the county of Greene and State of New York, have invented certain new and useful Improvements in Pneumatic Cushions for Sleighs, Carriages, and Similar Vehicles, of which the following is a full and complete specification, such as will enable those skilled in the art to which it appertains to make and use the same.

This invention relates to pneumatic cushions for sleighs, carriages, and other vehicles; and the object thereof is to provide an improved pneumatic cushion for the purpose specified which may be inflated whenever desired, a further object being to provide a pneumatic cushion of the class referred to which is composed of two separate parts, which are formed integrally or secured together, one of said parts being higher than the other.

The invention is fully disclosed in the following specification, of which the accompanying drawings form a part, in which—

Figure 1 is a plan view of my improved cushion, and Fig. 2 a sectional view thereof.

In the drawings forming part of this specification the separate parts of my improvement are designated by the same numerals of reference in each of the views, and in the practice of my invention I provide a frame or cushion-support which consists of a bottom 5, ends 6, and a back 7, and between the ends 6 I place my improved cushion 8.

The cushion 8 is preferably divided transversely of the center by a partition 9 into two separate parts 10 and 11, and one of said parts is preferably higher than the other.

My improved cushion is also composed of rubber, rubber and canvas, or similar material, and may be provided with any suitable covering, and I also provide ordinary air-nozzles or inflating-tubes 12, which are connected with the bottom of each part of said cushion and by means of which the separate parts of the cushion may be inflated, as will be readily understood.

It will be understood that the air-nozzles or inflating-tubes 12 are provided with automatic valves in the usual manner, but this feature of the construction forms no part of this invention and is therefore not shown.

Having fully described my invention, I claim as new and desire to secure by Letters Patent—

A pneumatic cushion-seat for sleighs, carriages, and other vehicles, said cushion being provided with a transverse central partition, and each part thereof being provided with means by which it may be inflated, and one part of the cushion being higher than the other, substantially as shown and described.

In testimony that I claim the foregoing as my invention I have signed my name, in presence of the subscribing witnesses, this 12th day of February, 1897.

LEWIS LYMAN PETETT.

Witnesses:
 PERCY WILE DECKER,
 JUDSON ALLERTON BETTS.